United States Patent [19]  [11] 4,105,809
Ohno et al.  [45] Aug. 8, 1978

[54] PROCESS FOR DEMISTING TRANSPARENT MATERIALS

[75] Inventors: Toshiaki Ohno, Fussa; Kiyoshi Niizeki, Itsukaichimachi, both of Japan

[73] Assignee: Hoya Lens Corporation, Tokyo, Japan

[21] Appl. No.: 784,270

[22] Filed: Apr. 4, 1977

[51] Int. Cl.² .................. C03C 17/32; B05D 7/04; B05D 1/36

[52] U.S. Cl. ................................ 427/164; 427/165

[58] Field of Search ............ 427/164, 165; 428/442, 428/447, 522

[56] References Cited

U.S. PATENT DOCUMENTS

| | | | |
|---|---|---|---|
| 3,515,579 | 6/1970 | Shepherd et al. | 428/442 X |
| 3,635,756 | 1/1972 | Shepherd et al. | 428/442 X |
| 3,865,619 | 2/1975 | Pennewiss et al. | 428/442 |
| 3,935,367 | 1/1976 | Merrill et al. | 428/442 X |

*Primary Examiner*—James R. Hoffman
*Attorney, Agent, or Firm*—Jay L. Chaskin

[57] ABSTRACT

Excellent and durable demisting property can be imparted to the surface of the transparent materials such as glass and plastics by coating onto the surface of said transparent materials a copolymer obtained by subjecting 2-hydroxyethyl methacrylate to solution polymerization and then graft-copolymerizing an allyl alcohol tribasic acid ester thereonto and then curing the copolymer by heating it. In this case, if an organo silicon nonionic surface active agent is added to said copolymer, more effective demisting property can be imparted to the surface of the transparent materials.

16 Claims, No Drawings

PROCESS FOR DEMISTING TRANSPARENT MATERIALS

The present invention relates to a process for preventing the surface of an optical part such as a lens, mirror and prism or the window glass of a car or ship which consist of a transparent material such as glass or a plastic (these are hereinafter generally referred to as "transparent materials") being misted with dewdrops. More particularly, the invention pertains to a process for demisting these transparent materials with a demisting agent consisting mainly of a copolymer obtained by subjecting 2-hydroxyethyl methacrylate (hereinafter referred to as "HEMA") to solution polymerization and then graft-polymerizing an allyl alcohol tribasic acid ester (hereinafter referred to as "AATE") onto the resulting polymer. Further, the invention relates to a process for demisting the transparent materials with a demisting agent obtained by adding an organo silicon nonionic surface active agent to the above-mentioned copolymer.

The demisting agents used in the present invention can impart demisting property to the surface of said transparent materials when they are coated onto the surface of the transparent materials, baked and then dried to form a durable demisting film on the surface.

In general, when the above-mentioned transparent materials are rapidly transferred into a wet atmosphere at a temperature of higher than dew point from an atmosphere at a temperature of lower than dew point, dew falls on the surface of the transparent materials and their transparency decreases. Further, these phenomena are maintained until the materials are brought to ambient temperature and dewdrops are evaporated, as usually experienced.

Several processes have heretofore been proposed to prevent the mist of such transparent materials. One of the processes comprises coating a certain kind of demisting agent to impart a temporary demisting effect. However, this process is unsatisfactory in durability since the effect is reduced on exposure to air of high humidity.

As a result of the present inventors' various studies, polymer compositions which can form a durable demisting film have now been found and an advantageous demisting process by the use of the compositions have been provided.

In general, a demisting film obtained by coating polyvinyl alcohol (PVA), polyvinylpyrrolidone (PVP), polyacrylamide, polyacrylic acid, etc. can produce its demisting effect by the hygroscopic and swelling properties of the materials. Therefore, such a demisting film has often been poor in durability since its hardness is reduced and it is injured or peeled off when it absorbs moisture and is swelled.

The present inventors have paid attention to the above-mentioned defect and considered not only hygroscopic and swelling properties but also "wetting" characteristic for water. Thus, they have found polymer compositions for forming an excellent demisting film in which dewdrops are instantaneously diffused on the surface of the transparent materials by "wetting", part of the moisture is absorbed and softening hardly occurs when the film absorbs moisture and is swelled.

The demisting agents according to the present invention are a copolymer obtained by subjecting HEMA which is a hydrophilic substance and then graft-copolymerizing an AATE such as triallyl cyanurate or triallyl isocyanurate as a modifier for improving chemical resistance and thermal resistance at 50° to 90° C for 0.5 to 2 hours and a mixture of the above-mentioned copolymer with an organo silicon nonionic surface active agent such as a silicone-alkylene oxide copolymer for improving surface active property and "wetting" characteristic.

The above-mentioned demisting agents are coated onto the surface of a transparent material, baked at 100° to 200° C for 20 to 60 minutes to form a demisting film. When the demisting film thus obtained is tested according to expiration method, no mist occurs. Also, even on exposure to a large amount of water vapor or dipping in water, the film is neither swelled nor peeled off. Its hardness is almost the same as that in a dry state, i.e., a pencil hardness of 4H (JIS K-5400). Also, the film is not colored at all and the optical characteristics of the original transparent materials do not change at all.

HEMA is added to an organic solvent in a ratio of 1:1 to 1:4, and 0.5 to 5% by weight of an organic peroxide catalyst or an azo polymerization catalyst based on the weight of HEMA is added to the resulting solution. The mixture is subjected to solution polymerization at 50° to 100° C for about 1 hour. When the solution polymerization proceeds and the viscosity of the reaction mixture becomes high, 5 to 15% by weight of AATE based on the weight of said HEMA and 3 to 5 times as much as the amount used in solution polymerization of said organic solvent are added to suppress the sudden increase of the viscosity. The mixture is subjected to graft polymerization at 50° to 90° C for 0.5 to 2 hours. Here, an increased amount of the catalyst and a rapid increase in temperature have an undesirable effect on the characteristics of the resulting demisting film. The thus obtained copolymer is coated onto the surface of a transparent material in a thickness of 1 to 100 μ according to spin coating method or dipping method. The resulting coating is heated at 100° to 200° C for 20 to 60 minutes to dry it. Thus, a demisting film is formed. This film has considerably durable demisting effect. However, the film is hygroscopic, and can not absorb excess moisture and is misted in the extreme case if a sudden change in temperature and/or humidity occurs. Regarding this respect, a demisting agent for forming a more effective demisting film wherein not only its hygroscopic property but also its "wetting" characteristic has been improved has been able to be prepared by adding the following modification.

To the copolymer obtained by subjecting said HEMA to solution polymerization, adding AATE to the polymer and then graft-polymerizing the mixture, 0.5 to 2% by weight of an organo silicon nonionic surface active agent is added to improve "wetting" of the finally obtained film for water. In this case, it is considered that the triazine ring of said AATE is effective in improving the thermal resistance of the surface active agent.

The mixture of the copolymer with the surface active agent is thoroughly stirred and coated onto the surface of a transparent material so that the optical characteristics of the material may not be impaired. The resulting coating is heated at 100° to 200° C for 20 to 30 minutes to cure it. The demisting effect of the thus obtained demisting film is tested according to expiration method which comprises blowing on the film and then examining the mist with the naked eye. The film of the copolymer obtained by polymerizing said HEMA and then graft-polymerizing AATE has a satisfactory demisting effect, but has the above-mentioned defect in that it can not absorb moisture eventually and it is misted when excess water vapor is blown thereon. Nevertheless, the film can be used satisfactorily for usual demisting and has a more durable demisting effect than that of prior art demisting films. Further, the film obtained by adding the surface active agent to said copolymer and then curing the mixture is hygroscopic and becomes easy to be wet on exposure to excess moisture. If water vapor is blown on the film, therefore, part of water vapor is absorbed by the film but the remainder is diffused over the whole surface of the film. Thereby, dew does not fall on the surface of the film and mist does not occur. Also, owing to the smaller amount of moisture absorbed, the film is not softened by swelling. Therefore, the film is durable in that the surface hardness and adhesive property of the film are not reduced. Even if the film is washed with water, the effect of the film is not deteriorated.

The organic solvents which may be used in the present invention are exemplified by ethylene glycol monomethyl ether, ethylene glycol monoethyl ether, ethylene glycol diethyl ether, diethylene glycol monomethyl ether, diethylene glycol monoethyl ether, dimethylformamide, etc.

Also, preferable examples of the organic peroxide catalysts used in the present invention are benzoyl peroxide, acetyl peroxide, lauroyl peroxide, tert-butyl peroxyisobutyrate, tert-butyl peroxyoctoate, tert-butyl peroxypivalate, diisopropyl peroxydicarbonate, etc. Further, the azo polymerization catalysts used in the present invention are those wherein an azo group is bonded to non-aromatic carbon atoms each having different valencies, and preferably to a tertiary non-aromatic carbon atom, and are exemplified by $\alpha,\alpha'$-azobisisobutyronitrile, azobiscyclohexanecarbonitrile and azobisisopropylnitrile.

Also, the organo silicon surface active agents used in the present invention are those represented by the general formula,

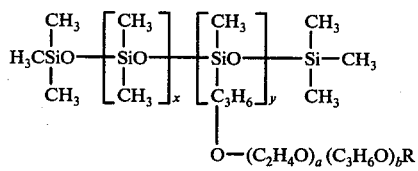

wherein R is hydrogen or a lower alkyl group.

The excellence of the demisting agents used in the process of the present invention has been confirmed by preparing many products in the above-mentioned manner and repeating tests. The following examples illustrate the present invention in more detail, but it is a matter of course that there are many embodiments of the invention using a combination of said raw materials other than the following examples.

EXAMPLE 1

In 200 g of ethylene glycol monoethyl ether (hereinafter referred to as "2EE") was dissolved 100 g of HEMA. To the resulting solution was added 2 g of $\alpha,\alpha'$-azobisisobutyronitrile (hereinafter referred to as "ABIN"). The mixture was well stirred and then polymerized at 65° to 70° C for about 1 hour. At the gelation point, 10 g of triallyl isocyanurate (hereinafter referred to as "TAIC") was added and the mixture was further polymerized. As the viscosity of the reaction mixture increased, 1500 g of 2 EE as a solvent was added to obtain 1800 g of copolymer solution.

After cooling, this solution was coated onto the surface of an optical part and then cured by placing the coated part in a drier at 150° C for 30 minutes.

When the demisting film thus obtained was tested according to expiration method, no mist occurred. However, mist occurred on exposure to excess water vapor.

EXAMPLE 2

To 50 g of the copolymer solution obtained in Example 1 was added 1 g of an organo silicon nonionic surface active agent. The mixture was well stirred, and then coated onto the surface of plate glass and cured at 150° C for 20 minutes.

When the resulting film was tested according to expiration method, no mist occurred. Also, even on exposure to excess water vapor, "wetting" phenomenon acted well and thereby no mist occurred. Further, on washing with water, it was confirmed that the demisting effect was durably maintained without being reduced.

EXAMPLE 3

To 50 g of the copolymer solution obtained in Example 1 were added 0.5 g of an organo silicon nonionic surface active agent and 0.5 g of hexamethoxymethylmelamine (hereinafter referred to as "HMM"). The mixture was well stirred and coated onto the surface of glass and then cured at 150° C for 30 minutes.

When the resulting film was tested by expiration method, no mist occurred. Also, even on exposure to excess water vapor, waterdrops were diffused by wetting and no mist occurred. Further, it was confirmed that the addition of HMM improved wettability of the film and increased the hardness of the film.

EXAMPLE 4

In 200 g of dimethylformamide (hereinafter referred to as "DMF") was dissolved 100 g of HEMA, and 1.5 g of benzoyl peroxide was added. The mixture was reacted at 80° to 90° C for about 1 hour. At the gelation point, 10 g of TAIC was added and the reaction was continued. As the viscosity of the reaction mixture increased, solvent DMF was suitably added to obtain about 1500 g of a copolymer solution.

To 50 g of this solution was added 0.8 g of an organo silicon nonionic surface active agent. The mixture was well stirred and coated onto the surface of glass and then cured at 140° C for 30 minutes.

When the resulting film was tested by expiration method, no mist occurred. Also, even on exposure to water vapor, waterdrops were diffused by wetting and no mist occurred.

Various modifications may be made by one skilled in the art to the disclosed embodiments without departing from the scope of the invention as defined by the claims.

What is claimed is:

1. A process for demisting a transparent material comprising the steps of:
   (1) coating onto a surface of the transparent material a copolymer obtained by subjecting 2-hydroxyethyl methacrylate to solution polymerization;
   (2) graft-copolymerizing an allyl alcohol tribasic acid ester onto the coating; and (3) curing the resulting grafted copolymer by heating.

2. A process according to claim 1, wherein an organo silicon nonionic surface active agent is further added to said copolymer.

3. A process according to claim 2 wherein the allyl alcohol tribasic acid is selected from triallyl cyanurate and triallyl isocyanurate.

4. A process according to claim 2 wherein the solution polymerization of the 2-hydroxyethyl methacrylate is carried out in the presence of 1 to 4 times the weight of the 2-hydroxyethyl methacrylate of an organic solvent and 0.5 to 5% by weight of an organic peroxide catalyst or an azo polymerization catalyst based on the weight of the 2-hydroxyethyl methacrylate at 50° to 100° C for about 1 hour.

5. A process according to claim 4 wherein said organic peroxide catalyst is selected from the group consisting of benzoyl peroxide, acetyl peroxide, lauroyl peroxide, tert-butyl peroxyoctoate, tert-butyl peroxypivalate and diisopropyl peroxydicarbonate.

6. A process according to claim 4 wherein said azo polymerization catalyst is selected from the group consisting of α,α'-azobisisobutyronitrile, azobiscyclohexanecarbonitrile and azobisisopropylnitrile.

7. A process according to claim 2 wherein the graft-polymerization is carried out by adding 5 to 15% by weight of the allyl alcohol tribasic acid ester based on the weight of the 2-hydroxyethyl methcrylate and 3 to 5 times as much as the amount used in the solution polymerization of an organic solvent and heating the mixture at 50° to 90° C for 0.5 to 2 hours.

8. A process according to claim 2 wherein said copolymer is coated onto the surface of the transparent material in a thickness of 1 to 100μ and then cured by heating it at 100° to 200° C for 20 to 60 minutes.

9. A process according to claim 1, wherein said allyl alcohol tribasic acid ester is selected from triallyl cyanurate and triallyl isocyanurate.

10. A process according to claim 1, wherein the solution polymerization of the 2-hydroxyethyl methacrylate is carried out in the presence of 1 to 4 times the weight of the 2-hydroxyethyl methacrylate of an organic solvent and 0.5 to 5% by weight of an organic peroxide catalyst or an azo polymerization catalyst based on the weight of the 2-hydroxyethyl methacrylate at 50° to 100° C for about 1 hour.

11. A process according to claim 10, wherein said organic solvent is selected from the group consisting of ethylene glycol monomethyl ether, ethylene glycol monoethyl ether, ethylene glycol diethyl ether, diethylene glycol monomethyl ether, diethylene glycol monoethyl ether and dimethylformamide.

12. A process according to claim 10, wherein said organic peroxide catalyst is selected from the group consisting of benzoyl peroxide, acetyl peroxide, lauroyl peroxide, tert-butyl peroxyisobutyrate, tert-butyl peroxyoctoate, tert-butyl peroxypivalate and diisopropyl peroxydicarbonate.

13. A process according to claim 10, wherein said azo polymerization catalyst is selected from the group consisting of α,α'-azobisisobutyronitrile, azobiscyclohexanecarbonitrile and azobisisopropylnitrile.

14. A process according to claim 1, wherein the graft-copolymerization is carried out by adding 5 to 15% by weight of the allyl alcohol tribasic acid ester based on the weight of the 2-hydroxyethyl methacrylate and 3 to 5 times as much as the amount used in the solution polymerization of an organic solvent and heating the mixture at 50° to 90° C for 0.5 to 2 hours.

15. A process according to claim 14 wherein said organic solvent is selected from the group consisting of ethylene glycol monomethyl ether, ethylene glycol monoethyl ether, ethylene glycol diethyl ether, diethylene glycol monomethyl ether, diethylene glycol monoethyl ether and dimethylforamide.

16. A process according to claim 1, wherein said copolymer is coated onto the surface of the transparent material in a thickness of 1 to 100 μ then cured by heating it at 100° to 200° C for 20 to 60 minutes.

* * * * *